H. F. WESSEL, Jr.
GRASS CATCHER FOR LAWN MOWERS.
APPLICATION FILED MAY 13, 1910.

986,883.

Patented Mar. 14, 1911.

2 SHEETS—SHEET 1.

Witnesses
Edwin G. McKee
John A. Donegan

Inventor
Henry F. Wessel Jr.,
By Victor J. Evans
Attorney

H. F. WESSEL, Jr.
GRASS CATCHER FOR LAWN MOWERS.
APPLICATION FILED MAY 13, 1910.
986,883.
Patented Mar. 14, 1911.
2 SHEETS—SHEET 2.
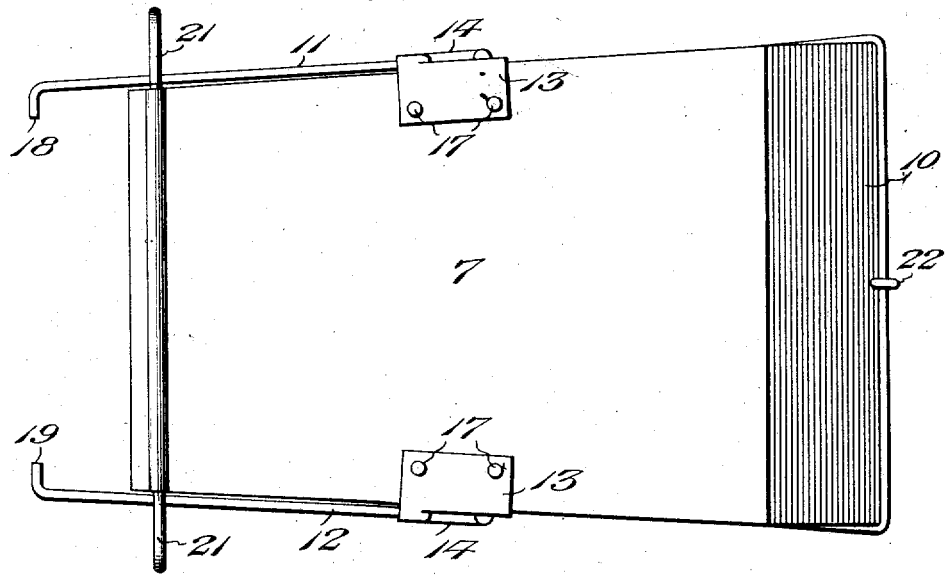
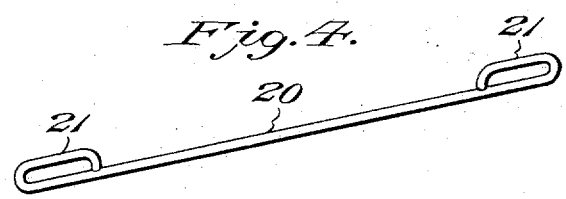
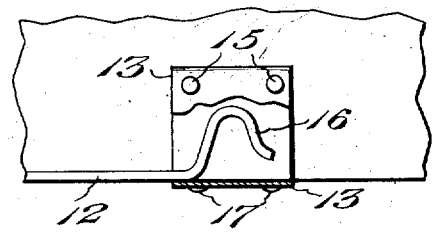 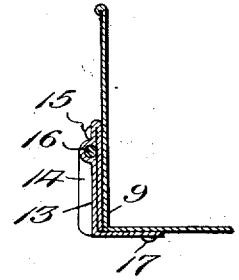
Inventor
Henry F. Wessel Jr.,
Witnesses
Edwin F. McKee
John Andonegan
By Victor J. Evans
Attorney

UNITED STATES PATENT OFFICE.

HENRY F. WESSEL, JR., OF HIGHLAND, ILLINOIS.

GRASS-CATCHER FOR LAWN-MOWERS.

986,883.  Specification of Letters Patent.  Patented Mar. 14, 1911.

Application filed May 13, 1910. Serial No. 561,109.

*To all whom it may concern:*

Be it known that I, HENRY F. WESSEL, Jr., a citizen of the United States, residing at Highland, in the county of Madison and State of Illinois, have invented new and useful Improvements in Grass-Catchers for Lawn-Mowers, of which the following is a specification.

This invention relates to improvements in grass catchers for lawn mowers and has for one of its objects the provision of a device of that kind including a metallic receptacle provided with a pair of oppositely positioned spring arms adapted to engage with a lawn mower and by their own resiliency to hold the receptacle in its proper position relative to the mower.

Another object is the provision of a support to be detachably secured to the handle of the mower when the latter is in operation and further adapted to be so secured to the receptacle as to provide a handle for transporting the latter when filled with grass and detached from the mower.

With these and other objects in view which will more fully hereinafter appear, the present invention consists in certain novel details of construction and arrangement of parts, hereinafter fully described, illustrated in the accompanying drawings and more particularly pointed out in the appended claims; it being understood that various changes in the form, proportion, size, and minor details of the device may be made, within the scope of the appended claims, without departing from the spirit or sacrificing any of the advantages of the invention.

Figure 1:
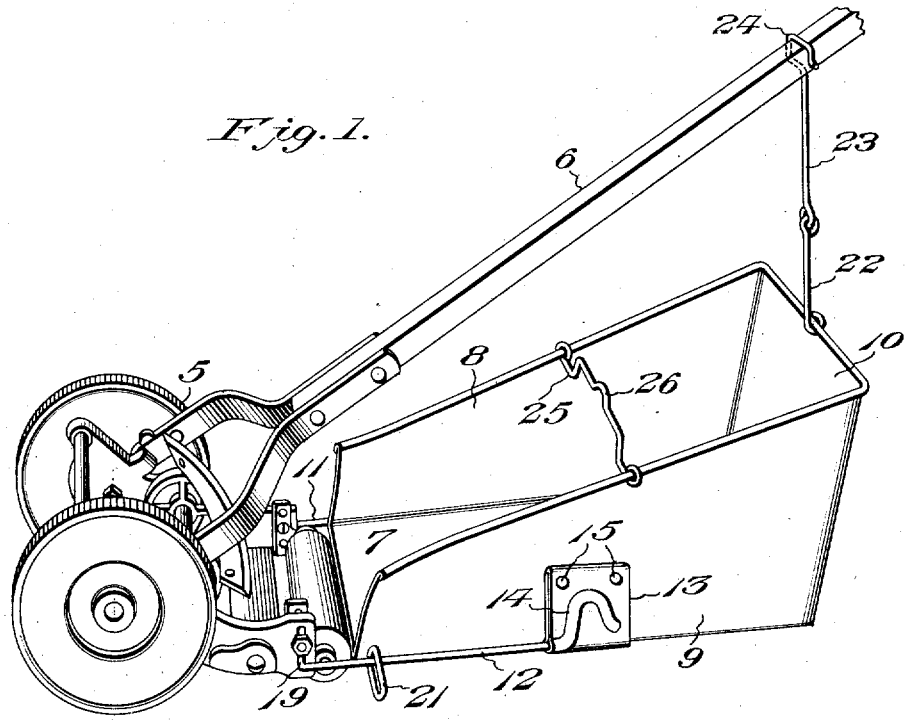
Figure 2:
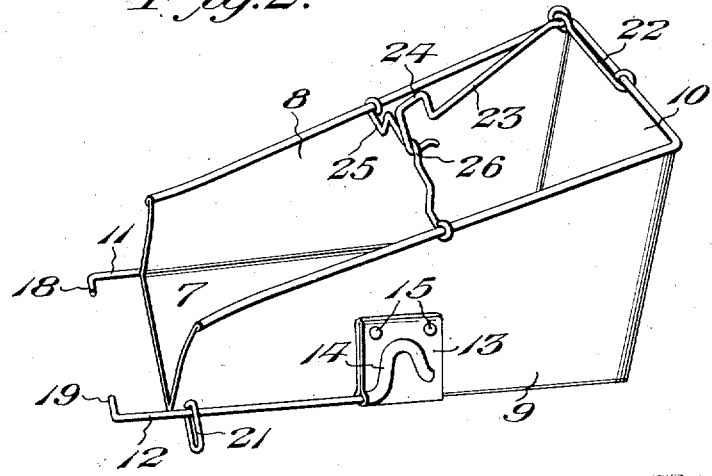

In the accompanying drawings, forming part of the specification;—Figure 1 is a perspective view of the device showing its application to the mower. Fig. 2 is a similar view after the device has been detached from the mower and filled with grass and ready to be carried to a place to receive the cut grass. Fig. 3 is a bottom plan view of the device. Fig. 4 is a detail perspective of the cross bar. Fig. 5 is a detail of one of the side walls of the receptacle showing a portion of one of the clips broken away and the inner end of one of the spring arms. Fig. 6 is a section through a portion of the receptacle.

Similar numerals of reference are employed to designate corresponding parts throughout.

The mower is designated by the numeral 5 and the handle thereof by the numeral 6. Since these parts are of well-known construction a detail description of the same need not be given.

The device forming part of the subject matter of the present invention comprises a receptacle preferably formed of sheet metal, the bottom of which is designated by the numeral 7 and the side walls by the numerals 8 and 9. The upper edges of the side walls incline upwardly and at their widened ends are connected by an end wall 10. That portion of the receptacle to which the end wall is attached will subsequently be termed the rear end wall, the opposite or open end of the receptacle will be termed the open end. It is to be understood that the width of the receptacle will correspond to the width of the cutting mechanism of the mower and may be of any desired length and depth.

For detachably securing the receptacle to the mower I employ a pair of spring arms designated by the numerals 11 and 12. These members are arranged on the opposite outer faces of the side walls and adjacent to their juncture with the bottom 7 are preferably formed of single pieces of stout steel wire or its equivalent. As shown in the drawings each of the arms is secured to the receptacle by means of a clip 13, preferably formed by bending upon itself, adjacent to its medial portion an oblong piece of sheet metal, and forming in one of the sides thus formed a substantially inverted V-shaped groove or channel designated by the numeral 14. The bent portion of the clip is secured to the side of the receptacle by means of rivets 15 or the like, said clip extending vertically, as shown in the drawings. The inner end portion of the spring arm terminates in a substantially inverted V-shaped extension 16 which is passed between the sides of the clip and seated in the groove or channel 14, after which the longer side of the clip is bent over the lower face of the bottom 7 and secured thereto by rivets or the like, as shown at 17. The free end portions of the spring arms 11 and 12 extend in advance of the opening or front end of the receptacle and terminate in inwardly extending trunnions 18 and 19, which extend beyond the opposed inner faces of the side walls 8 and 9 and are insertible into openings formed in the mower 5. By virtue of the trunnions 18 and 19 it will be evident that the receptacle will be pivotally connected with the mower so as to properly move with the latter over uneven ground. Extending transverse the forward end of the bottom 7 and secured to the lower surface thereof is a bar 20, the opposite ends of which are curved to provide oblong loops 21, which receive the free end portions of the arms 11 and 12, the axes of said loops extending in a horizontal plane. By the provision of these loops outward movement of the free end portions of the sides will be limited and consequent accidental displacement of the receptacle prevented.

The rear end wall of the receptacle is connected with the handle 5 by means of a support, which in the present instance is shown to include a pair of sections designated by the numerals 22 and 23, the section 22 having one end provided with an eye which receives a similar eye on one end of the section 23. The opposite end of the section 22 is curved into an eye and passed through an opening formed in the medial portion and adjacent to the upper edge of the end wall 10. The free end of the section 23 is provided with a rectangular-shaped hook 24, adapted to engage with the handle 6 of the mower. Owing to the shape of the hook 24 it will be manifest that the said hook may be readily attached to and detached from the handle whenever desired.

By forming the support in jointed sections it will be manifest when the receptacle passes over hilly ground upward movement of the receptacle will be permitted.

By reference now to the drawings it will be seen that a cross bar 25 has its opposite end portions fixedly secured to the medial portions of the side walls 8 and 9 and adjacent to the upper edge thereof. The medial portion of the cross bar 25 is curved to provide a socket 26, and the distance between the cross bar and end wall 10 will be somewhat less than the length of the support just described, so that after the receptacle is filled with cut grass and the hook 24 detached from the handle 6 the said hook may move into engagement with the socket 26 of the cross bar, whereby the handle will be provided for carrying the receptacle to the place where it is desired to deposit the cut grass.

From the foregoing, it is evident that I have provided a device which is comparatively simple in structure and inexpensive in manufacture, embodying few parts and these so arranged that the danger of derangement will be reduced to a minimum.

I claim:—

1. In a grass catcher for lawn mowers the combination of a receptacle, a cross bar carried thereby, and a support including a pair of resilient sections pivotally connected together, one end of one of said sections being loosely connected with one end of the receptacle and the free end of the other of said sections terminating in a hook adapted to embrace either the cross bar or handle of the mower.

2. An attachment for grass catching receptacles for lawn mowers comprising a clip formed of an oblong metallic sheet bent transversely adjacent its medial portion to provide sides of unequal length, the said sides being fixedly secured together, and further secured to the outer side of the receptacle, the shorter side being next to the receptacle the longer of the said sides of the clip having a portion bent inwardly and secured to the bottom of the receptacle, one of the sides of said clip being provided on its inner surface with a substantially inverted V-shaped channel, and a spring arm having one end adapted to engage the mower and terminating at its opposite end in a substantially inverted V-shaped extension insertible between the sides of the clip and arranged in the channel.

In testimony whereof I affix my signature in presence of two witnesses.

HENRY F. WESSEL, Jr.

Witnesses:
 EDGAR G. MERWIN,
 FRED STOCKER.